Jan. 22, 1946.  H. I. SELCH  2,393,424
BORING OR LIKE TOOL
Filed Jan. 11, 1945    2 Sheets-Sheet 1
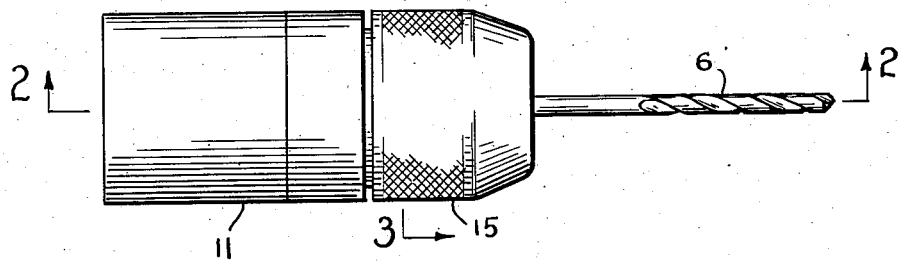
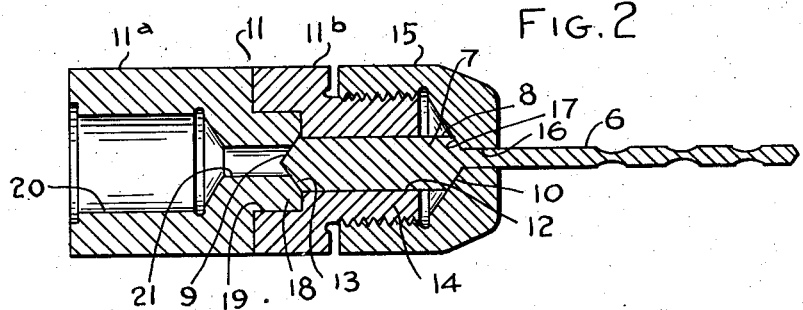
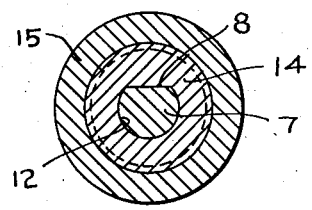
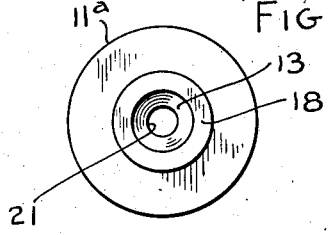
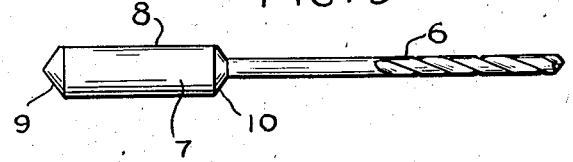
INVENTOR.
Howard I. Selch
BY William Cleland
Attorney Jan. 22, 1946.  H. I. SELCH  2,393,424
BORING OR LIKE TOOL
Filed Jan. 11, 1945   2 Sheets-Sheet 2
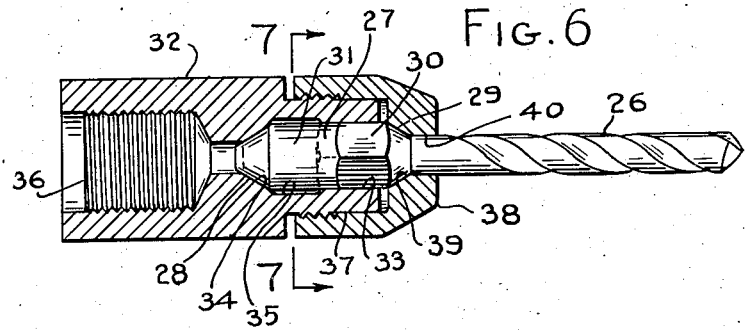
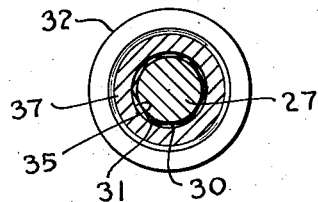 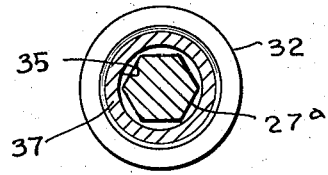
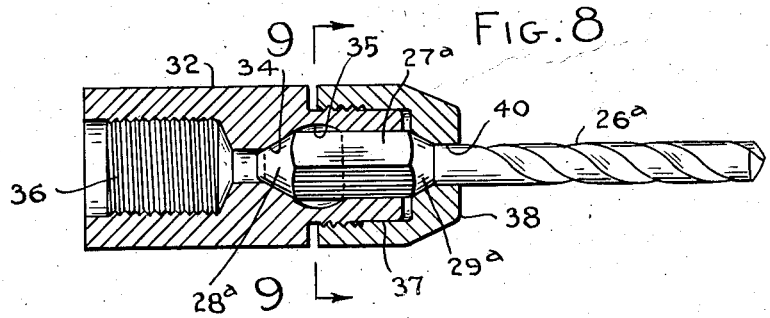
INVENTOR.
Howard I. Selch
BY William Cleland Patented Jan. 22, 1946

2,393,424

UNITED STATES PATENT OFFICE 2,393,424

BORING OR LIKE TOOL

Howard I. Selch, Chicago, Ill.

Application January 11, 1945, Serial No. 572,392

6 Claims. (Cl. 279—91)

This invention relates to improvements in boring or like rotary tools and relates particularly to a new drill or similar rotary tool and new chuck therefor, designed for use with each other to more economically and efficiently attain the desired result.

In executing the current tremendous war building program the power driven drill, for example, is extensively used, particularly in the aircraft industry, and the present drills and chucks have proven very unsatisfactory. The chucks now in use with drills of known construction are soon damaged and destroy a large percentage of the drills, resulting, not only in a great tool loss, but also in a considerable loss because of defective work, thus greatly retarding the war building program.

To overcome these difficulties, applicant has provided a special drill and chuck which can be used to advantage only in combination and which perfectly centers the drill in the chuck, securely holds the drill in position, prevents worn shanks on drills, eliminates chuck keys, results in fewer bent drills, prevents drill wobbling and drill breakage.

Other objects are to provide a chuck of greatly simplified construction which is composed of few parts and which can be economically manufactured and will efficiently operate without the use of jaws, keys, set screws or similar parts.

These objects or advantages are attained in a chuck and rotary tool unit of simple compact construction, the size of the unit being maintained at a minimum.

This application is a continuation in part of application Serial No. 540,679, filed June 16, 1944, now abandoned.

The foregoing and other objects of the invention will be manifest from the following brief description and the accompanying drawings.

Of the accompanying drawings:

Figure 1 is a side elevational view of a chuck constructed in accordance with this invention, the same being shown with an improved drill operatively secured therein.

Figure 2 is a central longitudinal view of same taken as indicated by line 2—2 of Figure 1.

Figure 3 is a cross-sectional view taken as indicated by line 3—3 of Figure 1.

Figure 4 is an end view of the left hand portion of the drill chuck shown in Figures 1 and 2, as viewed from the right thereof.

Figure 5 is a side elevational view of a drill constructed in accordance with this invention.

Figure 6 is a longitudinal cross-section similar to Figure 2 of a modified form of the invention.

Figure 7 is a cross-section taken on line 7—7 of Figure 6.

Figure 8 is a longitudinal cross-section similar to Figure 2, of another modified form of the invention.

Figure 9 is a cross-section taken on line 9—9 of Figure 8.

Proceeding now to a detailed description of the particular adaptation of the invention illustrated in Figures 1 to 5 of the drawings, the drill 6 has an enlarged cylindrical shank 7 which has a flattened side 8 or is ribbed, slotted or otherwise formed to be non-rotatably received in a chuck socket. The butt or inner end of the shank terminates in a conical surface or shoulder 9 and the forward end of the shank is provided with a conical shoulder 10 which meets the main body of the drill 6. The conical ends of the shank are concentrically arranged relative to the drill 6 and are oppositely disposed to form centering surfaces, the purpose of which is hereinafter described. In forming the flattened side 8 only a minor portion of the shank 7 is removed whereby the surfaces 9 and 10 extend circumferentially around the ends of the shank.

In the drawings there is shown a chuck body 11 which may be formed in one piece with a coaxially arranged socket 12 having a bottom wall 13 conforming in shape and adapted to receive the conical end 9 of the drill shank 7. The chuck body 11 is offset smaller adjacent the outer or tool-receiving end thereof and the offset portion 14 is externally threaded. While the screw threads on the portions 14 are of the ordinary or standard type, a quick thread or any suitable thread may be used.

The numeral 15 denotes a cap having an internally threaded wall for receiving the offset portion 14 on which it is operatively threaded. The cap 15 is provided with a centrally positioned axial opening 16 through which the main body of the drill 6 projects. The cap 15 is provided on the inner side thereof with a conical seat 17 which is coaxially arranged around the opening 16 to receive the conical shoulder 10 on the forward end of the shank 7. The cap 15 is operable, by turning it on threaded part 14 of chuck 11, to grip shank portion 7 of the drill with the opposed conical surfaces 9 and 10 thereof in self-centering engagement with the complemental conical seats 13 and 17 of the chuck 11 and cap 15, respectively.

The socket 12 is of the same cross-sectional shape as the shank 7 and, as only a minor portion of the shank 7 is removed to form the flat side 8, the conical surface 10 extends circumferentially around the forwardly presented end of the shank 7.

To facilitate the manufacture of the improved chuck, as shown in the drawings, it can be formed in two parts 11a and 11b. The base part 11a is provided with an axial cylindrical boss which is snugly fitted into a correspondingly shaped recess 19 in part 11b. The part 11a is provided with a spindle socket 20, from which a relatively small bore 21 extends axially through boss 18. The conical seat 13 which is the inner end wall of the socket 12 is formed on the end of the boss 18, and the boss is sweated, welded or otherwise fixedly secured in the recess 19 to form what is in effect a one piece body 10. Other methods may be employed to form the chuck body 11 having a socket 12 of irregular cross-section with an inner wall 13 forming a complete conical seat.

The bore 21 can be used as a "knock-out" bore. In case the shank 7 becomes rusted or otherwise stuck in the socket 12, a punch or other instrument may be inserted through the cavity 20 and bore 21 to force the shank therefrom.

The word drill is used to designate any other cutting tool adapted to be used with a shank 7 having the conical bearing surfaces 9 and 10 as shown. Other rotary tools which readily lend themselves to the present invention are, as examples, reamers, grinders, threaders, router bits, end mills, etc.

Referring to the modified form of the invention illustrated in Figures 6 and 7, the numeral 26 designates a drill having an enlarged shank portion 27 provided with an inner conical end or shoulder 28 and an outer conical shoulder 29, substantially like drill 6 in Figures 1 and 2. Drill 26, however, has a portion of its length adjacent shoulder 29 formed hexagonal in cross-section, as indicated at 30 in Figures 6 and 7, the remaining length of the shank being cylindrical in cross-section as indicated at 31. The diameter of cylindrical shank portion 31 being equal to or less than the distance across flats of hexagonal shank portion 30 (see Figure 7), said portion 31 will pass freely through the hexagonal portion 33 of the chuck.

A chuck 32, similar to chuck 11, is provided at one end with an axial socket 33, at least a portion of which is hexagonal in cross-section for freely slidably and non-rotatably receiving hexagonal shank portion 30, and the inner end of the socket being conical to provide a seat 34 for complementally receiving the conical inner shoulder 28. The socket 33 may be broached at 35 adjacent the inner end thereof to assure proper seating of said inner conical shoulder. The other end of the chuck is suitably internally threaded at 36 for mounting the same on a threaded stem of a power-driven device (not shown).

The socket or drill-receiving end of chuck 32 is reduced to provide a neck 37, which is provided with a threaded portion for quickly releasably receiving a cap 38 having an inner conical seat 39 for complementally receiving conical shoulder 29, an aperture 40 being provided for receiving the drill body therethrough.

As before the arrangement is such that tightening the cap 38 on chuck 32 will securely grip the elongated shank 27 with the inner and outer conical shoulders 28 and 29 thereof in complemental engagement with the conical seats 34 and 39 of the chuck 32 and cap 38, respectively. In use of the unit, rotation of the drill relatively to the chuck is prevented by interfitting of hexagonal shank portion 32 in the hexagonal portion of socket 33.

In Figures 8 and 9 is shown another modification of the invention, in which the enlarged shank 27a of drill 26a is hexagonal in cross-section along its entire length between the inner and outer conical shoulders 28a and 29a, respectively. This form of the invention being otherwise substantially the same as the construction shown in Figures 6 and 7, like parts are given like numerals.

It will be seen that each chuck and drill unit herein described forms in combination, a precision instrument which can be manufactured at a relatively low cost and which can be more economically used than boring tools of known construction.

In all forms of the invention described above the clearance between the enlarged shank and the chuck socket is sufficient to permit free reception of the shank in the socket, whereby is assured requisite self-centering action between the spaced conical shoulders of the shank and the complemental conical seats of the chuck and cap, but such clearance being sufficiently close to preclude subsequent binding action between the complemental flats, which binding action might tend to throw the chuck, cap and tool out of concentricity.

Modifications of the invention may be resorted to without departing from the spirit thereof or the scope of the appended claims.

What is claimed is:

1. A device of the character described comprising a cutting tool having an enlarged shank portion provided on the perimeter thereof with at least one radially outwardly presented flattened side, said enlarged shank portion having conical shoulders at inner and outer terminal ends thereof, a chuck having a socket complemental in cross-section to the cross-section of said enlarged shank and including a flattened portion or portions complemental to the flattened side or sides of said cutting tool, said socket non-rotatably receiving said enlarged shank, said socket terminating inwardly in a conical seat for complementally receiving said inner conical shoulder of the shank portion, and a cap releasably secured to said chuck and having an aperture therein for receiving the tool body therethrough, said cap having an inner conical seat for complementally receiving said outer conical shoulder of the shank portion, said cap being operable on said chuck to grip said shank portion with said conical shoulders thereof in self-centering engagement with the conical seats of said chuck and said cap.

2. A device of the character described comprising a cutting tool having an enlarged shank portion of polygonal cross-section, said enlarged shank portion having conical shoulders at inner and outer terminal ends thereof, a chuck having a socket complemental in cross-section to the cross-section of said enlarged shank for non-rotatably receiving the same, said socket terminating inwardly in a conical seat for complementally receiving said inner conical shoulder of the shank portion, and a cap threaded onto said chuck and having an aperture therein for receiving the tool body therethrough, said cap having an inner conical seat for complementally receiving said outer conical shoulder of the shank portion, said cap being operable on said chuck to grip said shank portion with said conical shoulders thereof in self-centering engagement with the conical seats of said chuck and said cap.

3. A device of the character described comprising a cutting tool having an enlarged shank portion a part of the length of which is of polygonal cross-section, said enlarged shank portion having conical shoulders at inner and outer terminal ends thereof, a chuck having a socket complemental in cross-section to the cross-section of said enlarged shank for non-rotatably receiving the same, said socket terminating inwardly in a conical seat for complementally receiving said inner conical shoulder of the shank portion, and a cap threaded onto said chuck and having an aperture therein for receiving the tool body therethrough, said cap having an inner conical seat for complementally receiving said outer conical shoulder of the shank portion, said cap being operable on said chuck to grip said shank portion with said conical shoulders thereof in self-centering engagement with the conical seats of said chuck and said cap.

4. A device of the character described comprising a cutting tool having an enlarged shank portion of which at least a part of the length thereof is of polygonal cross-section, said enlarged shank portion having conical shoulders at inner and outer terminal ends thereof, a chuck having a socket of which at least a part of the length thereof is complemental in cross-section to said polygonal part of said shank portion for non-rotatably receiving the same, said socket terminating inwardly in a conical seat for complementally receiving said inner conical shoulder of the shank portion, and a cap threaded onto said chuck and having an aperture therein for receiving the tool body therethrough, said cap having an inner conical seat for complementally receiving said outer conical shoulder of the shank portion, said cap being operable on said chuck to grip said shank portion with said conical shoulders thereof in self-centering engagement with the conical seats of said chuck and said cap.

5. A device of the character described comprising a cutting tool having an enlarged shank portion at least a part of the length of which is hexagonal in cross-section, said enlarged shank portion having conical shoulders at inner and outer terminal ends thereof, a chuck having a socket of which at least a part of the length thereof is complemental in cross-section to said hexagonal part of said shank portion for non-rotatably receiving the same, said socket terminating inwardly in a conical seat for complementally receiving said inner conical shoulder of the shank portion, and a cap threaded onto said chuck and having an aperture therein for receiving the tool body therethrough, said cap having an inner conical seat for complementally receiving said outer conical shoulder of the shank portion, said cap being operable on said chuck to grip said shank portion with said conical shoulders thereof in self-centering engagement with the conical seats of said chuck and said cap.

6. In a boring tool, the combination of a drill having an enlarged shank portion provided with a flat side, said shank portion having a butt end terminating in a conical surface, the forwardly presented end of said shank portion tapering to the drill body to form a shoulder having a curcumferentially extending conical surface; and a chuck having an axially directed bore of the same cross-sectional shape as said shank, said bore terminating in a complete conical surface for exactly receiving the butt end of said shank; and a cap threaded on the forwardly presented end portion of said chuck, said cap having an axial bore for receiving the drill body and provided on the inner side thereof with an inwardly presented conical seat for receiving the said forwardly presented conical shoulder on said shank, said cap operable against said shoulder to securely hold said drill in a coaxial position in said chuck.

HOWARD I. SELCH.